April 25, 1967  G. F. PARKER ET AL  3,315,336

METHOD OF MAKING FILTER ELEMENT

Original Filed May 7, 1962  2 Sheets-Sheet 1

INVENTORS
GEORGE F. PARKER
and GEORGE E. SLATER
BY
Strauch, Nolan, Neale, Nies & Bronaugh
ATTORNEYS April 25, 1967 G. F. PARKER ET AL 3,315,336
METHOD OF MAKING FILTER ELEMENT
Original Filed May 7, 1962 2 Sheets-Sheet 2
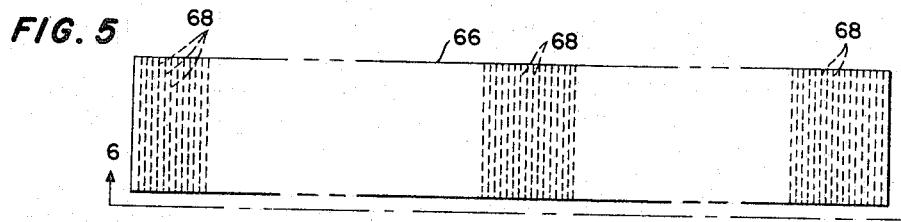
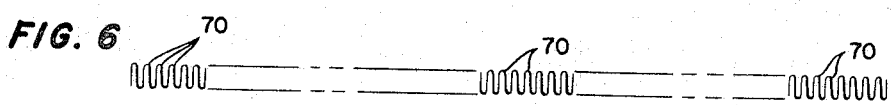
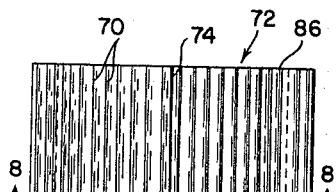
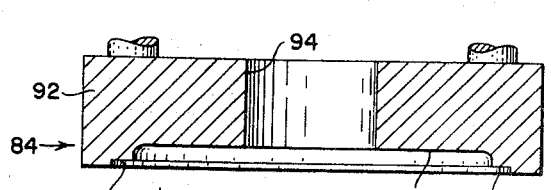
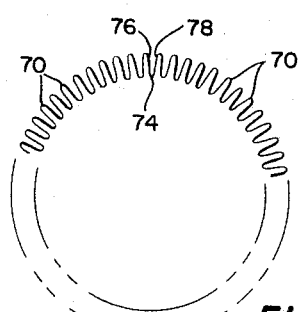
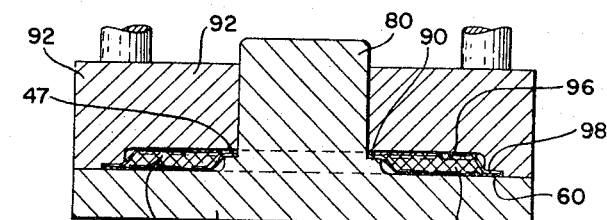
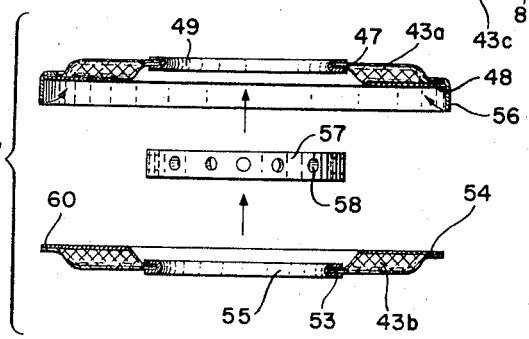
INVENTORS
GEORGE F. PARKER
and GEORGE E. SLATER
BY
Strauch, Nolan, Neale, Nies & Bronaugh
ATTORNEYS United States Patent Office
3,315,336
Patented Apr. 25, 1967

3,315,336
METHOD OF MAKING FILTER ELEMENT
George F. Parker, Cleveland, and George E. Slater, Gates Mills, Ohio, assignors, by mesne assignments, to Rockwell Standard Corporation, a corporation of Delaware
Original application May 7, 1962, Ser. No. 192,654, now Patent No. 3,261,474, dated July 19, 1966. Divided and this application Apr. 11, 1966, Ser. No. 541,692
5 Claims. (Cl. 29—163.5)

This is a division of Ser. No. 192,654 filed May 7, 1962 for Filter Element and Method of Making Same issued July 19, 1966 as United States Letters Patent No. 3,261,474.

This invention relates to filter elements used in liquid or other fluid filter assemblies and more particularly to a novel method of making the same.

The filter element of the present invention in its preferred embodiment is composed essentially of a bendable material such as fine wire mesh that can be crimped, folded or pleated to a desired shape and structure which it will maintain. In a preferred method of manufacture, a flat strip of such material is folded transversely in an accordion pattern and then rolled up to form a cylinder, the opposite ends of the rolled strip being securely and preferably permanently attached together as by welding, glueing or the like.

This corrugated cylinder is then axially collapsed and spread out to assume an annular disc shape so that one end of the former cylinder forms the inner diameter of the annular disc and the other end is expanded to form the outer diameter.

The radially corrugated annular disc thus formed is then flattened to a certain depth around the edges of its inner and outer diameters, these flattened annular rim portions being disposed in different parallel planes perpendicular to the disc axis. A stiff reinforcing ring is then clamped over and around the inner flat rim, and two discs provided with such inner rings are then placed together in assembly with an apertured stiff spacer ring interposed between them in axial abutment with the respective reinforcing rings and with the outer flat rims of the discs in axial abutment. An outer stiff reinforcing ring is then clamped over the abutting outer rims of the two dics to combine the two discs and associated rings into a relatively stiff disc element.

A series of these disc elements, when suitably placed on the apertured center tube of a filter unit, as will appear, provides a filter arrangement which allows fluid to enter both sides of the discs, pass through the folded material and along the radial folds through apertures in the spacer rings in each disc assembly and through aligned holes into the center tube. Fluid also flows through the pleat walls substantially tangentially of the discs. Fluid flow may, of course, be reversed by passing through the center tube first.

By varying the number and depths of the folds in the disc material an infinite variety of filter surface areas can be provided and in any instance the surface area of the filter disc is considerably increased as compared to conventional disc filters, especially the so-called edge type filters.

Accordingly it is the main object of the present invention to provide a novel method of making an axially compact filter disc element having an increased corrugated surface filter area.

An important object of the invention resides in the novel method of manufacture wherein a strip of shape retaining filter material such as fine wire mesh is laterally folded to desired corrugations, rolled into a cylinder, axially flattened to disc shape and formed with inner and outer stiffened rims to provide a relatively stiff self-supporting annular filter disc.

A further object of the invention is the provision of novel method of making crimped filter discs wherein the effective filtering area may be established during manufacture by varying the depth and/or number of crimped sections.

Another object of the invention resides in the provision of a novel method of making a filter disc having increased surface area from any foldable, crimpable, or pleatable filter material.

Other objects and novel features of the invention will become apparent from the following detailed description in connection with the appended drawings in which:

FIGURE 5 illustrates a strip of filter material to be folded;

FIGURE 6 is a side elevation of the folded filter material strip;

FIGURE 7 illustrates the folded strip of FIGURE 6 rolled into a cylinder;

FIGURE 8 is an end view of the cylinder of FIGURE 7;

FIGURES 9 and 10 illustrate different parts of the step of axially collapsing the cylinder of FIGURE 7 to form an annular radially corrugated disc; and FIGURE 11 is an exploded view illustrating assembly of two filter discs into a filter element.

Figure 1:
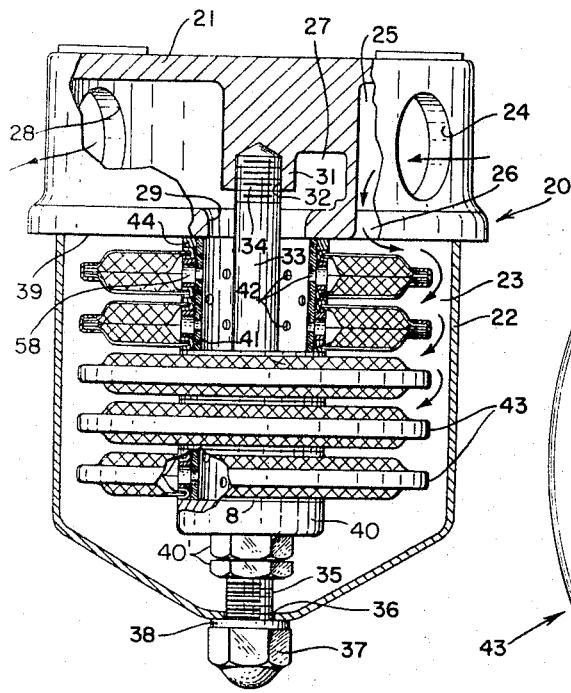
FIGURE 1 is a side elevation partially broken away and in section through a filter assembly incorporating filter elements made according to a preferred embodiment of the invention.

FIGURE 1 illustrates a filter assembly 20 comprising a rigid housing 21 to which is removably secured a filter casing 22 enclosing a space 23. Housing 21 has an inlet opening 24 for introducing gas or other fluid into a passage 25 that discharges through bottom opening 26 into space 23, as indicated by the arrows in FIGURE 1.

Internally housing 22 is formed with a chamber 27 separate from passage 25 and communicating with an outlet indicated at 28. A bottom opening 29 is provided substantially centrally of the housing in alignment with a boss 31 having a threaded downwardly open bore 32.

A support rod 33 has a threaded upper end 34 received in bore 32, and its lower threaded end 35 extends through a bottom casing opening 36. A nut 37 is mounted on the projecting end of rod 33, and a sealing washer 38 is provided over opening 36. With rod 30 rigidly mounted and axially fixed in bore 32, when nut 37 is drawn tight it urges casing 22 tightly against the bottom wall of housing 21 with compressed washer 38 sealing the opening at 36. Usually an annular seal (not shown) is provided between the upper edge of casing 22 and the bottom flat wall surface 39 of housing 21. Housing 21 is usually a metal casting, and casing 22 is usually a stiff sheet metal stamping.

Rod 33 is surrounded in spaced relation by an axially rigid cylindrical or other tubular metal sleeve 41 that has its upper end in abutment with flat surface 39 in surrounding relation to opening 29. A series of rows of apertures 42 are provided in sleeve 41 at equally axially spaced levels for a purpose to appear. A plurality of annular filter elements 43 are axially assembled upon sleeve 41. A rigid locating ring 44 is interposed between uppermost element 43 and surface 39, and an annular retainer plate 40 axially abuts the lower end of sleeve 41 and the lowermost element 43. A suitable locknut assembly 40' on the threaded portion 35 of the support rod, when drawn tight, urges the upper end of sleeve into tight abutment with housing surface 39 and properly locates the stack of filter elements as will appear.

In operation the fluid entering space 23 traverses the filter elements 43 to be later described and enters sleeve 41 through apertures 42 to pass upwardly through opening 29 and chamber 27 to outlet 28.

Referring particularly to FIGURES 1–4, each filter element 43 consists essentially of two substantially identical but reversed annular filter discs 43a and 43b held in operative assembly.

Figure 3:
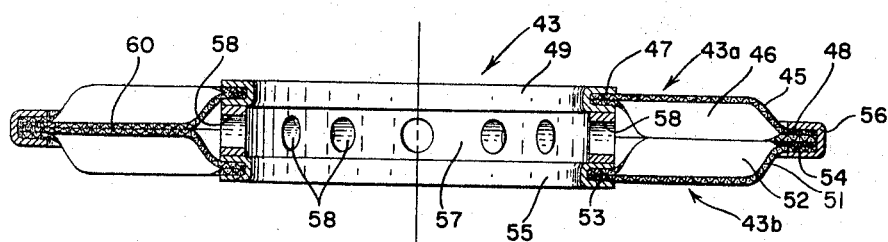
FIGURE 3 is an enlarged diametral section through a filter element of FIGURE 1.

Filter disc 43a comprises an annulus 45 of fine mesh filter material such as metal wire cloth which will hold a crimped or pleated shape formed with a series of generally radial corrugations 46 which extend between an inner flat annular peripheral rim 47 and an outer flat annular peripheral rim 48. Rims 47 and 48 are concentric and parallel but are disposed in axially spaced planes which extend at right angles to the center line of the element as shown in FIGURE 3. A stiff sheet metal reinforcing ring 49 of generally U-shape in cross-section is clenched upon and around the inner edge of rim 47.

Filter disc 43b similarly comprises an annulus 51 of the same fine mesh filter material formed with a series of generally radial corrugations 52 which extend between an inner flat annular peripheral rim 53 and an outer flat annular peripheral rim 54. Rims 53 and 54 are concentric and lie in parallel axially displaced planes as in disc 43a, and a stiff sheet metal reinforcing ring 55 of U-shape is clenched upon and around the inner edge of rim 53.

The relatively reversed positions of filter discs 43a and 43b in the filter element is shown in FIGURE 3 wherein these discs are assembled in concentric relation with outer rims 48 and 54 in axial surface contact, and the two discs 43a and 43b are secured together in assembly by an outer stiff sheet metal ring 56 which is of generally U-shape and clenched about and along the outer edges of the contacting outer disc rims concentric with rings 49 and 55.

The axial space between inner rings 49 and 55 in the filter element assembly is occupied by a rigid spacer and passage forming ring 57 that is of about the same diameter and radial width as rings 49 and 55 and is also of such axial extent as to be tightly clamped between the discs 43a and 43b in the assembly when outer ring 56 is secured in place.

Figure 4:
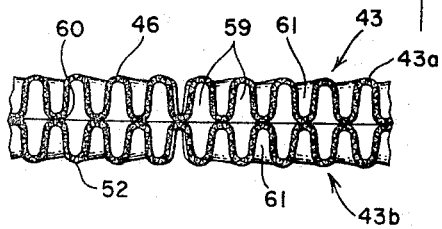
FIGURE 4 is a sectional view taken substantially along line 4—4 of FIGURE 2 showing the folded material.

Ring 57 is formed with a series of openings 58 which are at least as large as openings 42 in sleeve 41 and of the same circumferential distribution as openings 42. It will be noted from FIGURE 3 that these openings 58 are in direct communication with the inner ends of all of the disc corrugations 46 and 52. As shown in FIGURE 4, the filter discs 43a and 43b are preferably so circumferentially disposed that the bottoms of the radial corrugations of the respective discs are adjacent at 60 and define generally radial flow passages 59 as well as provide for generally tangential liquid flow through the filter element, and also define opposed external channels 61, thereby providing considerable filter surface area exposed to the fluid.

Referring back to FIGURE 1, several of these filter elements 43 are mounted within casing 22. The inner diameter of rings 49, 55, 58 is such that each filter element 43 slides smoothly onto sleeve 41, and ring 44 is of such dimensions that uppermost filter element 43 will be located with its ring passages 58 aligned with sleeve apertures 42. The axial spacing of the aperture rows 42 may be such that all of the apertures 42 align with the openings 58 of the respective filter elements when the stack is secured on sleeve 41 by the lock nut assembly. Ring 57 prevents axial collapse of the inner rims of the filter discs during the mounting on sleeve 41.

After the filter elements 43 are secured to the housing 21, the enclosing casing 22 is mounted.

FIGURES 5 to 11 show the method steps for making the filter discs and assembling them into the filter element.

FIGURES 5 and 6 show a linear strip of filter material 66 which may be fine wire cloth or any filter material that can be pleated or folded. The strip is laterally folded as along lines 68 back and forth to provide accordion fold pleats or corrugations 70 along its entire length and symmetrically on both sides thereof. The number of folds and the depth of each fold can be raised to obtain different filter areas. This corrugated strip 66 is then rolled into a cylinder 72 with the corrugations 70 extending axially as shown in FIGURES 7 and 8. The strip ends are welded, glued or otherwise permanently attached as at 74.

The corrugated cylinder 72 is now placed axially around a post 80 on the anvil die 82 of a die press 84 illustrated in FIGURE 9 and carefully axially collapsed toward generally annular condition by axial pressure applied endwise in the direction indicated by the arrows in FIGURE 9. During this collapse the upper edge 86 of cylinder 72 is contracted into a smaller diameter inner circle, and the lower edge 88 of cylinder 72 is expanded into a larger diameter outer circle with both circles being in the same plane when the cylinder is completely collapsed. The lower edge 88 slides on smooth flat die surface 89 during this operation.

Completion of the collapsing and stamping operation is illustrated in FIGURE 10. The center post 80 on the anvil die 82 is provided around its base with a raised annular flat ledge 90 for a purpose to appear. The upper die 92 of the die press 84 is provided with a central aperture 94 to fit smoothly over the post 80, and the outer periphery of its die cavity 96 is formed with a flat annular shallow ledge 98.

When the dies are closed as in FIGURE 10, corrugated cylinder 72 will be completely collapsed into a disc 43a (or 43b). The ledge 90 coacts with the flat bottom surface of cavity 96 to flatten the inner disc periphery to form the compressed annular inner rim and the ledge 98 coacts with flat die surface 89 to form the flat outer rim, and since these ledge surfaces are in different planes the rims will be formed in axially displaced parallel planes.

This flat forming of the inner and outer disc rims under pressure provides an annular disc structure wherein the compressed material of flat rims tends to stiffen the entire disc holding the corrugations in place, and prevent tendency of the disc to return toward its original cylindrical condition.

The next step is to apply the inner rings 49 and 55 of two of the formed discs produced by the operation of FIGURE 10.

Then two of these discs with inner stiffening rings attached are arranged in reversed relation as shown in FIGURE 11 and brought together until the assembly is as shown in FIGURE 3, the clenching of ring 56 about the outer periphery being the final step which holds all of the parts permanently together.

Figure 2:
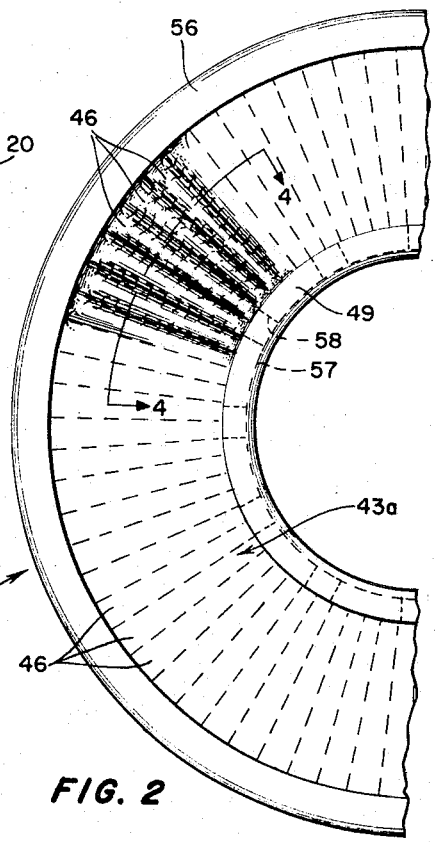
FIGURE 2 is a partial enlarged plan view of a filter element of FIGURE 1.

The term "substantially radial corrugations" used herein is intended to describe the structure resulting from any mode of forming the filter material such as folding back and forth, fluting, pressing, crimping and the like, whether accomplished in one operation or in successive lateral bendings along the strip. It will be noted as shown in FIGURE 2 that as a result of the preferred method of manufacture herein disclosed the corrugations vary in dimensions between the inner and outer peripheries of the disc, but it is to be understood that the invention is of sufficient scope to include filter discs wherein the corrugations may be substantially of the same dimensions along their lengths and/or may not lie exactly on radii of the formed disc.

The filter elements of the invention are self-contained and sufficiently stiff to withstand normal high fluid pressures encountered in filter services today. The solid spacer ring insert and the reinforced outer and inner edges all combine in the assembly to prevent nesting and collapse of the corrugated filter structure and thus the maximum surface area is always presented for filtering.

The present invention may be embodied in other specific forms without departing from the spirit or essential characteristics thereof, and therefore the preferred embodiment is to be considered in all respects as illustrative only and not restrictive, the scope of the present invention being indicated by the appended claims rather than by the foregoing description.

What is claimed and desired to be secured by Letters Patent is:

1. In a method of making a filter disc, the steps of laterally corrugating a strip of filter material, joining the ends of said strip to form a cylindrical tubular structure wherein the corrugations are longitudinal, axially collapsing said tubular structure into an annular disc wherein the corrugations extend substantially radially, and compressing the inner and outer peripheries of said annular disc to form inner and outer flat annular peripheral regions.

2. In the method defined in claim 1, said peripheral regions lying in different parallel planes substantially normal to the axis of said disc.

3. In the method of making a filter disc defined in claim 1, the further step of securing a reinforcing ring upon and along said inner peripheral region.

4. In the method defined in claim 1, said step of laterally corrugating the strip being accomplished by accordion folding a strip of said material.

5. In the method defined in claim 1, said strip of material being a shape retaining wire cloth sheet.

References Cited by the Examiner
UNITED STATES PATENTS

| | | | |
|---|---|---|---|
| 2,334,263 | 11/1943 | Hartwell | 210—494 |
| 2,591,056 | 4/1952 | Ericson | 29—486 |
| 3,017,698 | 1/1962 | Hambrecht et al. | 29—419 X |
| 3,084,427 | 4/1963 | Holcomb | 29—419 |

JOHN F. CAMPBELL, *Primary Examiner.*

THOMAS H. EAGER, *Examiner.*